(12) United States Patent
Mizuta et al.

(10) Patent No.: US 11,339,245 B2
(45) Date of Patent: May 24, 2022

(54) MONOMER MIXTURE AND CURABLE COMPOSITION CONTAINING SAME

(71) Applicant: DAICEL CORPORATION, Osaka (JP)

(72) Inventors: Tomoya Mizuta, Himeji (JP); Keizo Inoue, Himeji (JP)

(73) Assignee: DAICEL CORPORATION, Osaka (JP)

( * ) Notice: Subject to any disclaimer, the term of this patent is extended or adjusted under 35 U.S.C. 154(b) by 230 days.

(21) Appl. No.: 16/611,296

(22) PCT Filed: Jul. 19, 2018

(86) PCT No.: PCT/JP2018/027112
§ 371 (c)(1),
(2) Date: Nov. 6, 2019

(87) PCT Pub. No.: WO2019/021934
PCT Pub. Date: Jan. 31, 2019

(65) Prior Publication Data
US 2020/0055977 A1 Feb. 20, 2020

(30) Foreign Application Priority Data

Jul. 28, 2017 (JP) .............................. JP2017-147079
Dec. 25, 2017 (JP) .............................. JP2017-247205

(51) Int. Cl.
*C08G 59/22* (2006.01)
*B33Y 10/00* (2015.01)
(Continued)

(52) U.S. Cl.
CPC .......... *C08G 59/223* (2013.01); *B29C 64/112* (2017.08); *B33Y 10/00* (2014.12);
(Continued)

(58) Field of Classification Search
CPC .... C08L 71/02; C08L 29/10; C08L 63/00–10; C09D 171/02; C09D 129/10;
(Continued)

(56) References Cited

U.S. PATENT DOCUMENTS

2005/0090580 A1   4/2005  Hiroki et al.
2016/0257828 A1*  9/2016  Kobayashi ........... C09D 11/101
(Continued)

FOREIGN PATENT DOCUMENTS

JP    10-158385 A    6/1998
JP    2001-89743 A   4/2001
(Continued)

OTHER PUBLICATIONS

Partial machine translation of JP-2011111598-A (2011).*
(Continued)

*Primary Examiner* — Kregg T Brooks
(74) *Attorney, Agent, or Firm* — Birch, Stewart, Kolasch & Birch, LLP

(57) ABSTRACT

The present invention is to provide a monomer mixture that is cured rapidly even in the presence of oxygen and that forms a cured product having high hardness and excellent adhesion to metals and/or glass. The monomer mixture according to an embodiment of the present invention contains two or more types of cationically polymerizable monomers. As the cationically polymerizable monomers, the monomer mixture contains at least 10 wt. %, based on a total amount of the monomer mixture, of a compound having at least one cationically polymerizable group selected from the group consisting of a vinyl ether group, an epoxy group, and an oxetanyl group, and at least one hydroxy group in a molecule, and at least 5 wt. %, based on the total amount of the monomer mixture, of a compound represented by Formula (b). In the formula, R represents an s-valent straight-
(Continued)

chain or branched saturated aliphatic hydrocarbon group or an s-valent group having two or more straight-chain or branched saturated aliphatic hydrocarbon groups bonded to each other through an ether bond, and s represents an integer of 2 or greater.

13 Claims, 1 Drawing Sheet

(51) Int. Cl.
| | |
|---|---|
| B33Y 70/00 | (2020.01) |
| B29C 64/112 | (2017.01) |
| C08G 59/24 | (2006.01) |
| C08J 5/00 | (2006.01) |
| C09D 4/00 | (2006.01) |
| C09D 11/101 | (2014.01) |
| C09D 11/322 | (2014.01) |
| C09J 4/00 | (2006.01) |
| C08F 216/14 | (2006.01) |
| C08G 65/18 | (2006.01) |
| C08L 63/00 | (2006.01) |
| C08L 71/00 | (2006.01) |
| C08L 29/10 | (2006.01) |
| B33Y 80/00 | (2015.01) |
| B29K 105/00 | (2006.01) |

(52) U.S. Cl.
CPC ........ *B33Y 70/00* (2014.12); *C08F 216/1416* (2013.01); *C08G 59/22* (2013.01); *C08G 59/24* (2013.01); *C08G 65/18* (2013.01); *C08J 5/00* (2013.01); *C08L 29/10* (2013.01); *C08L 63/00* (2013.01); *C08L 71/00* (2013.01); *C09D 4/00* (2013.01); *C09D 11/101* (2013.01); *C09D 11/322* (2013.01); *C09J 4/00* (2013.01); *B29K 2105/0002* (2013.01); *B33Y 80/00* (2014.12); *C08J 2363/00* (2013.01)

(58) Field of Classification Search
CPC ............ C09D 163/00–10; C09J 171/02; C09J 129/10; C09J 163/00–163/10; C08F 216/1416; C08G 59/18–72; C08G 59/226; C08G 65/18

See application file for complete search history.

(56) References Cited

U.S. PATENT DOCUMENTS

| | | | | |
|---|---|---|---|---|
| 2017/0158812 | A1* | 6/2017 | Mizuta | ................ C08G 59/24 |
| 2020/0230925 | A1* | 7/2020 | Nishio | ................ C09J 131/04 |

FOREIGN PATENT DOCUMENTS

| | | | |
|---|---|---|---|
| JP | 2005-154738 A | | 6/2005 |
| JP | 389833 B2 | | 3/2007 |
| JP | 2009-227804 A | | 10/2009 |
| JP | 2011111598 A | * | 6/2011 |
| WO | WO 2014/171141 A1 | | 10/2014 |
| WO | WO 2015/005211 A1 | | 1/2015 |
| WO | WO 2016/158522 A1 | | 10/2016 |
| WO | WO 2017/110951 A1 | | 6/2017 |

OTHER PUBLICATIONS

Extended European Search Report dated May 6, 2020, issued in counterpart European Patent Application No. 18838866.4.
Internationa Search Report (Form PCT/ISA/210), dated Aug. 28, 2018, for International Application No. PCT/JP2018/027112, with an English translation.
Written Opinion of the International Searching Authority (Form PCT/IB/310 & PCT/ISA/237), dated Dec. 2, 2019, for International Application No. PCT/JP2018/027112, with an English translation.

* cited by examiner

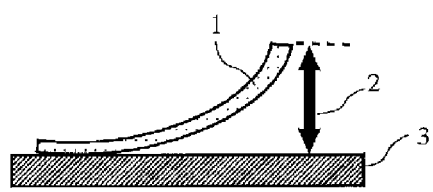

MONOMER MIXTURE AND CURABLE COMPOSITION CONTAINING SAME

TECHNICAL FIELD

The present invention relates to a monomer mixture and a curable composition containing the same. The curable composition is suitably used as ultraviolet-curable inkjet inks, coating agents, and adhesive agents. The present application claims priority to JP 2017-147079 filed to Japan on Jul. 28, 2017 and JP 2017-247205 filed to Japan on Dec. 25, 2017, whose content is incorporated herein.

BACKGROUND ART

Inkjet recording method, in which printing is performed by jetting ink droplets onto a recording medium to form recording dots, does not require master plates and is advantageously used in printing applications that requires high-variety and low-volume printing. As the inkjet ink used in the inkjet recording method, cationically curable inks and radically curable inks are known.

The radically curable inks have been used often because of their rapid curability and a wide variety of monomer types. However, the inkjet recording method uses an ink having low viscosity from the viewpoint of dischargeability, and oxygen in the air readily diffuses/migrates into such ink. Furthermore, because such ink is printed as small droplets, the surface area of the ink tends to be greater, and the ink is readily exposed to oxygen. As a result, curing inhibition due to oxygen is significant, and curing is inhibited due to the effect of oxygen, leading to problems such as printing blur or persistence of a large amount of unreacted monomers, which cause a bad odor. Furthermore, another problem is low adhesion to a substrate, and it is necessary to process a substrate surface to enhance the adhesion of such ink.

On the other hand, cationically curable inks are not subjected to curing inhibition by oxygen. Furthermore, the cationically curable inks are superior in adhesion to a substrate compared to a radically curable ink. Patent Document 1 describes that a cationically curable composition containing an alicyclic epoxy compound, a di- or tri-vinyl ether compound, and 3-alkyl-3-hydroxyalkyloxetane as monomers has low viscosity, and when the cationically curable composition is used as an inkjet ink, the cationically curable composition exhibits excellent dischargeability, is rapidly cured upon ultraviolet light irradiation, exhibits excellent substrate adhesion, and forms a cured product having a high hardness.

CITATION LIST

Patent Document

Patent Document 1: JP 3893833 B

SUMMARY OF INVENTION

Technical Problem

However, the cured product of the cationically curable composition described in Patent Document 1 has low adhesion to metals and/or glass. To enhance the adhesion, surface-processing treatment, such as primer treatment, needs to be performed on the metals and/or glass. Furthermore, the hardness is also unsatisfactory.

Therefore, an object of the present invention is to provide a monomer mixture that is cured rapidly even in the presence of oxygen and that forms a cured product having a high hardness and excellent adhesion to metals and/or glass.

Another object of the present invention is to provide a monomer mixture that is cured rapidly even in the presence of oxygen and that forms a cured product having high hardness, excellent dimensional stability, and excellent adhesion to metals and/or glass.

Another object of the present invention is to provide a curable composition containing the monomer mixture and a curing catalyst.

Another object of the present invention is to provide a curable composition that is useful as an ultraviolet-curable inkjet ink, a coating agent, or an adhesive agent.

Another object of the present invention is to provide a cured product or a molded article of the curable composition.

Another object of the present invention is to provide a structure including the cured product of the curable composition on a substrate.

Solution to Problem

As a result of diligent research to solve the problems described above, the inventors of the present invention found that, when a curing catalyst is added to a monomer mixture containing, in particular content ranges, a compound having at least one cationically polymerizable group selected from the group consisting of a vinyl ether group, an epoxy group, and an oxetanyl group and at least one hydroxy group in a molecule, and a compound having a structure in which at least two glycidyl ether groups are bonded to a chain-like aliphatic backbone as the cationically polymerizable monomers, excellent curing sensitivity is achieved. Upon irradiation with ultraviolet light, the monomer mixture can be rapidly cured even in the presence of oxygen and can form a cured product having high hardness and excellent adhesion to metals and/or glass. The present invention has been completed based on these findings.

That is, the present invention provides a monomer mixture containing two or more types of cationically polymerizable monomers, the monomer mixture containing, as the cationically polymerizable monomers, not less than 10 wt. %, based on a total amount of the monomer mixture, of a compound having at least one cationically polymerizable group selected from the group consisting of a vinyl ether group, an epoxy group, and an oxetanyl group, and at least one hydroxy group in a molecule being contained, and not less than 5 wt. %, based on the total amount of the monomer mixture, of a compound represented by Formula (b):

[Chemical Formula 1]

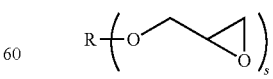

where R represents an s-valent straight-chain or branched saturated aliphatic hydrocarbon group or an s-valent group having two or more straight-chain or branched saturated aliphatic hydrocarbon groups bonded to each other through an ether bond, and s represents an integer of 2 or greater.

The present invention also provides the monomer mixture described above, further containing not less than 20 wt. %, based on the total amount of the monomer mixture, of a compound represented by Formula (b') as the cationically polymerizable monomer:

[Chemical Formula 2]

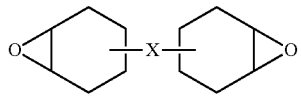 (b')

where X represents a single bond or a linking group.

The present invention also provides the monomer mixture described above, where a content of a compound having one cationically polymerizable group selected from the group consisting of a vinyl ether group, an epoxy group, and an oxetanyl group and having no hydroxy group in a molecule is less than 30 wt. % based on the total amount of the monomer mixture.

The present invention also provides a curable composition containing the monomer mixture described above and a curing catalyst.

The present invention also provides the curable composition described above containing a sensitizer, or a sensitizer and a sensitization auxiliary agent.

The present invention also provides the curable composition described above containing a coloring material.

The present invention also provides the curable composition described above containing a dispersing agent.

The present invention also provides the curable composition described above, where the curable composition is an ultraviolet-curable inkjet ink.

The present invention also provides the curable composition described above where the curable composition is a coating agent.

The present invention also provides the curable composition described above where the curable composition is an adhesive agent.

The present invention also provides a cured product of the curable composition described above.

The present invention also provides a molded article formed from the cured product described above.

The present invention also provides a method of producing a molded article including: ejecting the curable composition described above using inkjet method, then curing the ejected curable composition, and forming a molded article from a cured product of the curable composition.

The present invention also provides a structure having the cured product described above on a substrate surface.

Advantageous Effects of Invention

The curable composition obtained by blending a curing catalyst in the monomer mixture according to an embodiment of the present invention having the configuration described above has low viscosity and excellent coatability before being irradiated with ultraviolet light, can be rapidly cured in the presence of oxygen and even in the presence of moisture by irradiation of ultraviolet light, and can form a cured product having high hardness and excellent adhesion to metals and/or glass. Furthermore, the cured product has low curing shrinkage and excellent dimensional stability.

Therefore, the curable composition can be suitably used as ultraviolet-curable inkjet inks, coating agents, and adhesive agents.

For example, when the curable composition is used as an ultraviolet-curable inkjet ink, the ink can be directly applied to a metal and/or glass surface even in the air atmosphere, and can form an ink coating film having significantly high accuracy, high hardness, and excellent adhesion by being cured thereafter.

BRIEF DESCRIPTION OF DRAWINGS

FIG. 1 is a schematic diagram illustrating a measurement method of a floating amount of a test piece when dimensional stability is evaluated.

DESCRIPTION OF EMBODIMENTS

Monomer Mixture

The monomer mixture according to an embodiment of the present invention contains two or more types of cationically polymerizable monomers, the monomer mixture containing, as the cationically polymerizable monomers, not less than 10 wt. %, based on a total amount of the monomer mixture, of a compound having at least one cationically polymerizable group selected from the group consisting of a vinyl ether group, an epoxy group, and an oxetanyl group, and at least one hydroxy group in a molecule (=compound (I)), and not less than 5 wt. %, based on the total amount of the monomer mixture, of a compound represented by Formula (b):

[Chemical Formula 3]

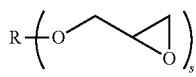 (b)

where R represents an s-valent straight-chain or branched saturated aliphatic hydrocarbon group or an s-valent group having two or more straight-chain or branched saturated aliphatic hydrocarbon groups bonded to each other through an ether bond, and s represents an integer of 2 or greater.

Compound (I)

The compound (I) in an embodiment of the present invention is a compound having at least two types of functional groups in a molecule. Specifically, the compound (I) is a compound having at least one cationically polymerizable group selected from the group consisting of a vinyl ether group, an epoxy group, and an oxetanyl group, and at least one hydroxy group in a molecule. The cured product formed by curing the curable composition containing the compound (I) has high hardness because the two types of the functional groups polymerize to form a highly crosslinked structure.

In particular, from the viewpoints of achieving a high hardness and a low curing shrinkage and enhancing adhesion of the resulting cured product, the compound (I) is preferably a compound (i) having one cationically polymerizable group selected from the group consisting of a vinyl ether group, an epoxy group, and an oxetanyl group, and one hydroxy group in a molecule.

The compound (i) include the following three types of compounds.

i-1: A compound having one vinyl ether group and one hydroxy group i-2: A compound having one epoxy group and one hydroxy group i-3: A compound having one oxetanyl group and one hydroxy group The compound (i) is represented by the following formula, for example:

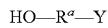
(i)

where $R^a$ represents a divalent hydrocarbon group, a divalent heterocyclic group, or a divalent group having these bonded to each other through a single bond or a linking group, Y represents a cationically polymerizable group selected from the group consisting of a vinyl ether group, an epoxy group, and an oxetanyl group.

The hydrocarbon group includes aliphatic hydrocarbon groups, alicyclic hydrocarbon groups, and aromatic hydrocarbon groups.

Examples of the divalent aliphatic hydrocarbon group include straight-chain or branched alkylene groups having from 1 to 18 carbons, such as a methylene group, a methylmethylene group, a dimethylmethylene group, an ethylene group, a propylene group, and a trimethylene group; straight-chain or branched alkenylene groups having from 2 to 18 carbons, such as vinylene, 1-methylvinylene, propenylene, 1-butenylene, 2-butenylene, 1-pentenylene, and 2-pentenylene group; and straight-chain or branched alkynylene groups having from 2 to 18 carbons, such as ethynylene, propynylene, 3-methyl-1-propynylene, butynylene, and 1,3-butadiynylene group.

The alicyclic ring constituting the divalent alicyclic hydrocarbon group includes monocyclic hydrocarbon rings and polycyclic hydrocarbon rings. The polycyclic hydrocarbon ring includes spiro hydrocarbon rings, ring-aggregated hydrocarbon rings, crosslinked ring hydrocarbon rings, condensed ring hydrocarbon rings, and crosslinked-condensed ring hydrocarbon rings.

Examples of the divalent alicyclic hydrocarbon group include groups obtained by removing two hydrogen atoms from the alicyclic structural formula described above.

Examples of the monocyclic hydrocarbon ring include $C_{3-12}$ cycloalkane rings, such as cyclopropane, cyclobutane, cyclopentane, cyclohexane, cycloheptane, and cyclooctane; $C_{3-12}$ cycloalkene rings, such as cyclopentene and cyclohexene.

Examples of the spiro hydrocarbon ring include $C_{5-16}$ spiro hydrocarbon rings, such as spiro[4.4]nonane, spiro[4.5]decane, and spiro bicyclohexane.

Examples of the ring-aggregated hydrocarbon ring include ring-aggregated hydrocarbon rings containing two or more $C_{5-12}$ cycloalkane rings, such as bicyclohexane.

Examples of the crosslinked ring hydrocarbon ring include bicyclic hydrocarbon rings, such as pinane, bornane, norpinane, norbornane, norbornene, bicycloheptane, bicycloheptene, and bicyclooctane (bicyclo[2.2.2]octane, and bicyclo[3.2.1]octane); tricyclic hydrocarbon rings, such as homobredane, adamantane, tricyclo[5.2.1.0$^{2,6}$]decane, and tricyclo[4.3.1.1$^{2,5}$]undecane; and tetracyclic hydrocarbon rings, such as tetracyclo[4.4.0.1$^{2,5}$.1$^{7,10}$]dodecane, and perhydro-1,4-methano-5,8-methanonaphthalene.

Examples of the condensed ring hydrocarbon ring include condensed rings in which a plurality of cycloalkane rings having from 5 to 8 members is condensed, such as perhydronaphthalene (decalin), perhydroanthracene, perhydrophenanthrene, perhydroacenaphthene, perhydrofluorene, perhydroindene, and perhydrophenalene.

Examples of the crosslinked-condensed ring hydrocarbon ring include dimers of dienes (e.g. dimers of cycloalkadienes, such as cyclopentadiene, cyclohexadiene, and cycloheptadiene), and hydrogenated products thereof.

Examples of the divalent aromatic hydrocarbon group include arylene groups having from 6 to 18 carbons, such as a phenylene group, a biphenylene group, and a naphthylene group.

The hydrocarbon group described above may have various substituents [e.g. halogen atoms, an oxo group, substituted oxy groups (e.g. alkoxy groups, aryloxy groups, aralkyloxy groups, and acyloxy groups), a carboxyl group, substituted oxycarbonyl groups (alkoxycarbonyl groups, aryloxycarbonyl groups, and aralkyloxycarbonyl groups), substituted or unsubstituted carbamoyl groups, a cyano group, a nitro group, substituted or unsubstituted amino groups, a sulfo group, and heterocyclic groups]. The carboxyl group may be protected by a protective group that is commonly used in the field of organic synthesis. Furthermore, an aromatic or non-aromatic heterocyclic ring may be condensed to a ring of the alicyclic hydrocarbon group or the aromatic hydrocarbon group.

Examples of the heterocyclic ring constituting the divalent heterocyclic group include heterocyclic rings containing an oxygen atom as a heteroatom (e.g. 4-membered rings, such as an oxetane ring; 5-membered rings, such as a furan ring, a tetrahydrofuran ring, an oxazole ring, an isoxazole ring, and a γ-butyrolactone ring; 6-membered rings, such as a 4-oxo-4H-pyran ring, a tetrahydropyran ring, and a morpholine ring; condensed rings, such as a benzofuran ring, an isobenzofuran ring, a 4-oxo-4H-chromene ring, a chroman ring, and an isochroman ring; crosslinked rings, such as a 3-oxatricyclo[4.3.1.1$^{4,8}$]undecan-2-one ring and a 3-oxatricyclo[4.2.1.0$^{4,8}$]nonan-2-one ring), heterocyclic rings containing a sulfur atom as a heteroatom (e.g. 5-membered rings, such as a thiophene ring, a thiazole ring, an isothiazole ring, and a thiadiazole ring; and 6-membered rings, such as a 4-oxo-4H-thiopyran ring; condensed rings, such as a benzothiophene ring), and heterocyclic rings containing a nitrogen atom as a heteroatom (e.g. 5-membered rings, such as a pyrrole ring, a pyrrolidine ring, a pyrazole ring, an imidazole ring, and a triazole ring; 6-membered rings, such as a pyridine ring, a pyridazine ring, a pyrimidine ring, a pyrazine ring, a piperidine ring, and a piperazine ring; condensed rings, such as an indole ring, an indoline ring, a quinoline ring, an acridine ring, a naphthryridine ring, a quinazoline ring, and a purine ring). The heterocyclic groups described above may also contain an alkyl group (e.g. $C_{1-4}$ alkyl groups, such as a methyl group and an ethyl group), cycloalkyl groups, and aryl groups (e.g. a phenyl group, and a naphthyl group), besides the substituent that may be contained in the hydrocarbon group. Examples of the divalent heterocyclic group include groups obtained by removing two hydrogen atoms from the heterocyclic ring structural formula described above.

Examples of the linking group include a carbonyl group (—CO—), an ether bond (—O—), a thioether bond (—S—), an ester bond (—COO—), an amide bond (—CONH—), and a carbonate bond (—OCOO—).

Among these, $R^a$ is preferably a divalent hydrocarbon group or a divalent group in which two or more hydrocarbon groups are bonded to each other through a linking group; particularly preferably a divalent aliphatic hydrocarbon group or a divalent group in which two or more aliphatic hydrocarbon groups are bonded to each other through a linking group; most preferably a straight-chain or branched alkylene group having from 1 to 18 carbons or a group in which two or more straight-chain or branched alkylene groups having from 1 to 18 carbons are bonded to each other through a linking group; and especially preferably a straight-chain or branched alkylene group having from 1 to 6 carbons or a group in which two or more straight-chain or branched alkylene groups having from 1 to 6 carbons are bonded to each other through a linking group. Furthermore, the linking group is preferably an ether bond.

The compound (i) preferably contains the compound (i-1) having one vinyl ether group and one hydroxy group and/or the compound (i-3) having one oxetanyl group and one hydroxy group from the viewpoint of forming a cured product having an even higher hardness. In particular, the compound (i) preferably contains at least the compound (i-3) having one oxetanyl group and one hydroxy group.

The compound (I) preferably contains at least one type selected from the group consisting of compounds represented by Formulas (i-1-1) to (i-1-3) and (i-3-1) below, and particularly preferably contains at least the compound represented by Formula (i-3-1) below.

[Chemical Formula 4]

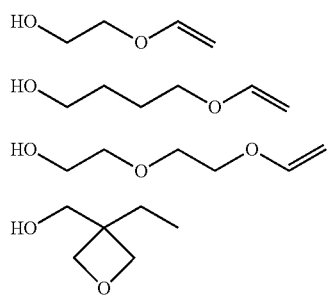

(i-1-1)

(i-1-2)

(i-1-3)

(i-3-1)

Compound (b)

The compound (b) according to an embodiment of the present invention is a compound represented by Formula (b):

[Chemical Formula 5]

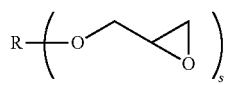

(b)

where R represents an s-valent straight-chain or branched saturated aliphatic hydrocarbon group or an s-valent group having two or more straight-chain or branched saturated aliphatic hydrocarbon groups bonded to each other through an ether bond, and s represents an integer of 2 or greater.

In the formula, s represents an integer of 2 or greater and is, for example, an integer of 2 to 6, preferably an integer of 2 to 4, particularly preferably an integer of 2 to 3, and especially preferably 2.

Among the s-valent straight-chain or branched saturated aliphatic hydrocarbon groups of R, examples of the divalent straight-chain or branched saturated aliphatic hydrocarbon group include straight-chain or branched alkylene groups having from 1 to 18 carbons (preferably from 1 to 10 carbons, and particularly preferably from 3 to 6 carbons), such as a methylene group, a methyl methylene group, a dimethyl methylene group, an ethylene group, a propylene group, a trimethylene group, and a tetramethylene group. Furthermore, examples of the tri- or higher-valent straight-chain or branched saturated aliphatic hydrocarbon group include groups obtained by further removing (s-2) atoms of hydrogens from the divalent straight-chain or branched saturated aliphatic hydrocarbon group structural formula.

The total number of carbons in the group represented by R is, for example, from 1 to 20, preferably from 2 to 15, particularly preferably from 2 to 10, and most preferably from 3 to 8.

Among these, as the compound (b), at least one type of compounds selected from the group consisting of compounds represented by Formulas (b-1) to (b-5) below, trimethylolethane triglycidyl ether, pentaerythritol tetraglycidyl ether, glycerin triglycidyl ether, and dipentaerythritol hexaglycidyl ether is preferred. From the viewpoint of achieving a low viscosity and excellent coatability, at least one type of compounds selected from the group consisting of Formulas (b-1) to (b-5) below is particularly preferred, and at least one type selected from the group consisting of compounds represented by Formulas (b-1) to (b-4) below is most preferred.

[Chemical Formula 6]

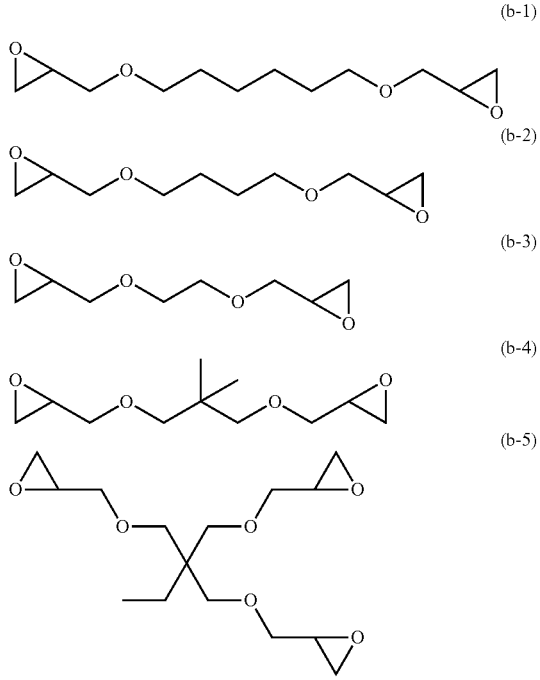

(b-1)

(b-2)

(b-3)

(b-4)

(b-5)

Vinyl Ether Compound (A)

The monomer mixture according to an embodiment of the present invention may contain, besides the compound (I) described above, one type or two or more types of compounds having at least one vinyl ether group and having no hydroxy group in a molecule (in the present specification, also referred to as "vinyl ether compound (A)"). The vinyl ether compound (A) may contain another cationically polymerizable group (e.g. an epoxy group, and an oxetanyl group) besides the vinyl ether group.

Examples of the vinyl ether compound (A) include compounds represented by Formula (a) below:

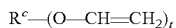

(a)

where $R^c$ represents a t-valent hydrocarbon group, t-valent heterocyclic group, or a t-valent group having these bonded to each other through a single bond or a linking group, and t represents an integer of 1 or greater.

t described above is an integer of 1 or greater and, for example, an integer of 1 to 10, preferably an integer of 1 to 5, and particularly preferably an integer of 2 to 5.

Examples of the t-valent hydrocarbon group and the t-valent heterocyclic group in $R^c$ include groups corresponding to divalent hydrocarbon groups and divalent heterocyclic groups in $R^a$. Furthermore, the t-valent hydrocarbon group and the t-valent heterocyclic group may each have a substituent. Examples of the substituent include substituents that may be included in the divalent hydrocarbon groups and the divalent heterocyclic groups in $R^a$, and groups containing an epoxy group or an oxetanyl group. Furthermore, examples of the linking group include the same groups that are exemplified for the linking group in $R^a$. Among these, $R^c$ is preferably a t-valent group having an alicyclic or heterocyclic skeleton.

As the vinyl ether compound (A), compounds represented by Formulae (a-1) and (a-2) below, cyclohexyl dimethanol monovinyl ether, cyclohexyl vinyl ether, cyclohexylmethyl vinyl ether, cyclohexylethyl vinyl ether, menthyl vinyl ether, tetrahydrofurfuryl vinyl ether, norbornenyl vinyl ether, 1-adamantyl vinyl ether, 2-adamantyl vinyl ether, 1,4-cyclohexanediol divinyl ether, and 1,4-cyclohexanedimethanol divinyl ether are preferred.

[Chemical Formula 7]

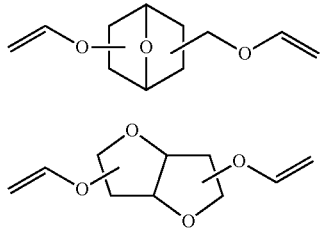

(a-1)

(a-2)

Epoxy Compound (B)

The monomer mixture according to an embodiment of the present invention may contain, besides the compound (I) and the compound (b) described above, one type or two or more types of compounds having at least one epoxy group and having no hydroxy group in a molecule (except the compound having a vinyl ether group; in the present specification, also referred to as "epoxy compound (B)"). The epoxy compound (B) may contain another cationically polymerizable group (e.g. an oxetanyl group) besides the epoxy group. Note that the epoxy group is a group having a 3-membered cyclic ether structure (oxirane ring structure).

The epoxy group contains a group formed from two carbon atoms that are adjacent to each other and that constitute an alicycle (e.g. 3 to 8-membered alicycle) and an oxygen atom (hereinafter, also referred to as "alicyclic epoxy group"), such as a cyclohexene oxide group represented by Formula (e-1), and/or an ethylene oxide group represented by Formula (e-2). In the formula below, $R^1$ represents a hydrogen atom or a $C_{1-3}$ alkyl group.

[Chemical Formula 8]

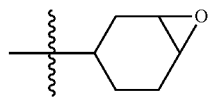

(e-1)

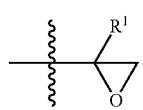

(e-2)

Among these, the epoxy compound (B) is preferably a compound having two or more epoxy groups in a molecule from the viewpoint of excellent curability. In particular, at least one type of compounds selected from the group consisting of compounds having two or more alicyclic epoxy groups in a molecule, compounds having two or more ethylene oxide groups in a molecule, and compounds having one or more alicyclic epoxy group and one or more ethylene oxide group in a molecule is preferred.

As the compound having two or more alicyclic epoxy groups in a molecule, for example, a compound represented by Formula (b') is preferred.

[Chemical Formula 9]

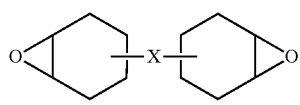

(b')

In Formula (b') above, X represents a single bond or a linking group.

Examples of the linking group include divalent hydrocarbon groups, alkenylene groups in which at least a part or all of carbon-carbon double bonds are epoxidized, a carbonyl group (—CO—), an ether bond (—O—), an ester bond (—COO—), a carbonate bond (—OCOO—), an amide bond (—CONH—), and groups in which a plurality of these are linked.

Examples of the divalent hydrocarbon group include straight-chain or branched alkylene groups having from 1 to 18 carbons, and divalent alicyclic hydrocarbon groups having from 3 to 18 carbons. Examples of the straight-chain or branched alkylene group having from 1 to 18 carbons include a methylene group, a methyl methylene group, a dimethyl methylene group, an ethylene group, a propylene group, and a trimethylene group. Examples of the divalent alicyclic hydrocarbon group having from 3 to 18 carbons include cycloalkylene groups (including cycloalkylidene groups), such as a 1,2-cyclopentylene group, a 1,3-cyclopentylene group, a cyclopentylidene group, a 1,2-cyclohexylene group, a 1,3-cyclohexylene group, a 1,4-cyclohexylene group, and a cyclohexylidene group.

For the alkenylene group, in which at least a part or all of carbon-carbon double bonds are epoxidized (also referred to as "epoxidized alkenylene group"), examples of the alkenylene group include straight-chain or branched alkenylene groups having from 2 to 8 carbons, such as a vinylene group, a propenylene group, a 1-butenylene group, a 2-butenylene group, a butadienylene group, a pentenylene group, a hexenylene group, a heptenylene group, and an octenylene group. In particular, as the epoxidized alkenylene group, an alkenylene group in which all carbon-carbon double bonds are epoxidized is preferred, and an alkenylene group which has from 2 to 4 carbons and in which all carbon-carbon double bonds are epoxidized is more preferred.

In the cyclohexene oxide group of Formula (b') above, a substituent may be bonded. Examples of the substituent include halogen atoms, $C_{1-10}$ alkyl groups, $C_{1-10}$ alkoxy groups, $C_{2-10}$ alkenyloxy groups, $C_{6-14}$ aryloxy groups, $C_{7-18}$ aralkyloxy groups, $C_{1-10}$ acyloxy groups, $C_{1-10}$ alkoxycarbonyl groups, $C_{6-14}$ aryloxycarbonyl groups, $C_{7-18}$ aralkyloxycarbonyl groups, epoxy group-containing groups, oxetanyl group-containing groups, $C_{1-10}$ acyl groups, isocyanate groups, sulfo groups, carbamoyl groups, and oxo groups.

Representative examples of the compounds represented by Formula (b') above include (3,4,3',4'-diepoxy)bicyclohexyl, bis(3,4-epoxycyclohexylmethyl) ether, 1,2-epoxy-1,2-bis(3,4-epoxycyclohexan-1-yl)ethane, 2,2-bis(3,4-epoxycyclohexan-1-yl)propane, 1,2-bis(3,4-epoxycyclohexan-1-yl)ethane, and compounds represented by Formulae (b'-1) to (b'-8) below. Note that L in Formula (b'-5) represents an alkylene group having from 1 to 8 carbons (e.g. a straight-chain or branched alkylene group having from 1 to 3 carbons, such as a methylene group, an ethylene group, a propylene group, and an isopropylene group). Furthermore, $n^1$ and $n^2$ in Formulae (b'-5) and (b'-7) each represent an integer of 1 to 30.

[Chemical Formula 10]

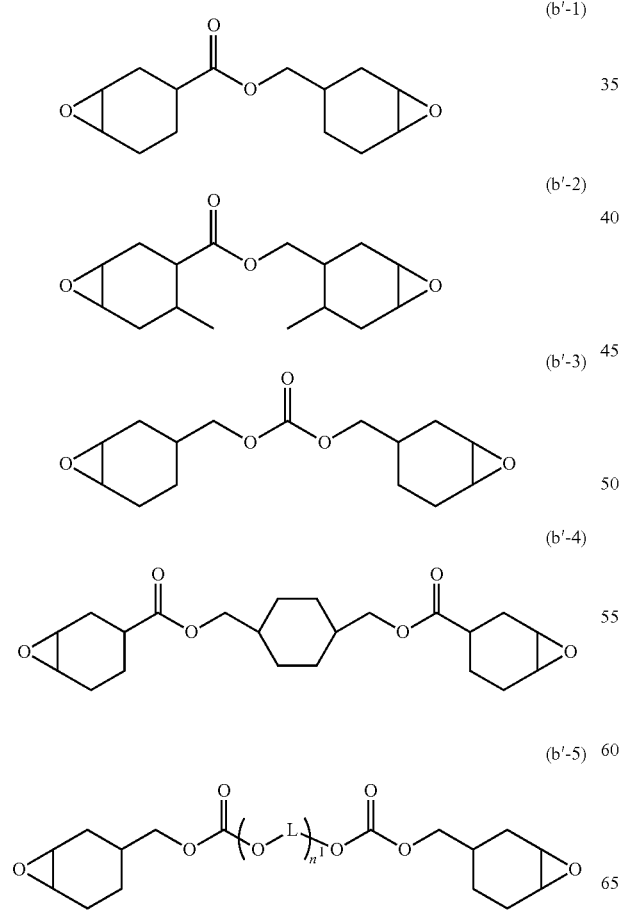

The compound having two or more alicyclic epoxy groups in a molecule further includes compounds represented by Formulas (b'-9) and (b'-10). In Formulae (b'-9) and (b-10'), $n^3$ to $n^8$ may be the same or different and each represent an integer from 1 to 30.

[Chemical Formula 11]

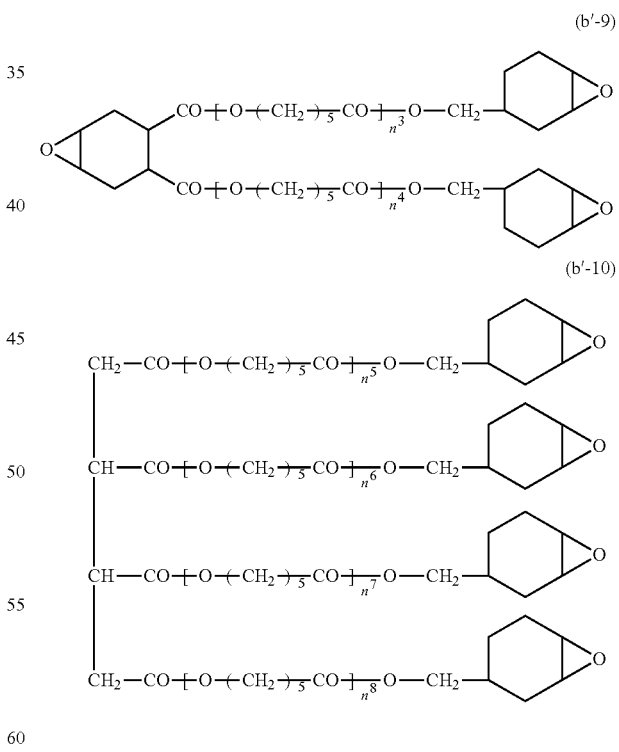

Examples of the compound having two or more ethylene oxide groups in a molecule include alicyclic glycidyl ethers, such as hydrogenated bisphenol A-type diglycidyl ether, hydrogenated bisphenol F-type diglycidyl ether, hydrogenated biphenol-type diglycidyl ether, hydrogenated phenol novolac-type diglycidyl ether, and hydrogenated cresol novolac-type diglycidyl ether; aromatic glycidyl ethers, such as bisphenol A-type diglycidyl ether, bisphenol F-type diglycidyl ether, biphenol-type diglycidyl ether, phenol novolac-type diglycidyl ether, and cresol novolac-type diglycidyl ether; and compounds represented by Formula (b″) below.

[Chemical Formula 12]

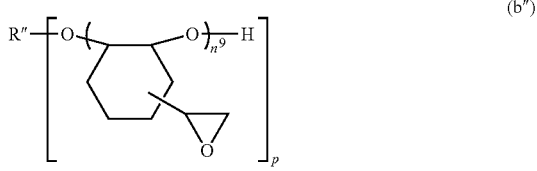

In Formula (b″), R″ represents a group (p-valent organic group) from which p groups of hydroxy groups (—OH) are removed from a structural formula of p-valent alcohol, and p and $n^9$ each represent a natural number. Examples of the p-valent alcohol [R″(OH)$_p$] include polyhydric alcohols (polyhydric alcohols having from 1 to 15 carbons and the like), such as 2,2-bis(hydroxymethyl)-1-butanol. p is preferably from 1 to 6, and $n^9$ is preferably from 1 to 30. In the case where p is 2 or greater, $n^9$ moieties of a group within [ ] (within the outer square brackets) may be the same or different. Specific examples of the compound represented by Formula (b″) above include 1,2-epoxy-4-(2-oxiranyl)cyclohexane adduct of 2,2-bis(hydroxymethyl)-1-butanol [e.g. trade name: "EHPE3150" (available from Daicel Corporation)].

Examples of the compound having one or more alicyclic epoxy groups and one or more ethylene oxide groups in a molecule include 1,2:8,9-diepoxylimonene.

The epoxy compound (B) preferably includes the compound having two or more alicyclic epoxy groups in a molecule (particularly, the compound represented by Formula (b′)) from the viewpoints of achieving rapid curability and forming a cured product having high hardness.

Oxetane Compound (C)

The monomer mixture according to an embodiment of the present invention may contain, besides the compound (I) described above, one type or two or more types of compounds having at least one oxetanyl group and having no hydroxy group in a molecule (except the compound having a vinyl ether group and/or an epoxy group; in the present specification, also referred to as "oxetane compound (C)"). Note that an oxetanyl group is a group having a 4-membered cyclic ether structure (trimethylene oxide ring structure).

The oxetane compound (C) is, for example, represented by Formula (c):

[Chemical Formula 13]

where $R^a$ represents a monovalent organic group, and $R^b$ represents a hydrogen atom or an ethyl group. m represents an integer of 0 or greater.

The monovalent organic group in $R^a$ includes monovalent hydrocarbon groups, monovalent heterocyclic groups, substituted oxycarbonyl groups (alkoxycarbonyl groups, aryloxycarbonyl groups, aralkyloxycarbonyl groups, cycloalkyloxy carbonyl groups, and the like), substituted carbamoyl groups (N-alkylcarbamoyl groups, N-arylcarbamoyl groups, and the like), acyl groups (aliphatic acyl groups, such as an acetyl group; aromatic acyl groups, such as a benzoyl group; and the like), and monovalent groups in which two or more of these are bonded to each other through a single bond or a linking group.

Examples of the monovalent hydrocarbon group and the monovalent heterocyclic group include groups corresponding to divalent hydrocarbon groups and divalent heterocyclic groups of $R^a$ described above. Examples of the linking group include the same groups that are exemplified for the linking group in $R^a$ described above. These groups may have a substituent, and examples of the substituent include the same groups that are exemplified for the substituent that may be included in the hydrocarbon group in $R^a$.

m represents an integer of 0 or greater and is, for example, from 0 to 20, and preferably from 0 to 1.

Among these, as the oxetane compound (C), use of the compound having two or more oxetanyl groups in a molecule is preferred from the viewpoints of achieving rapid curability and obtaining a cured product having high hardness, and for example, compounds represented by Formula (c-1), and compounds represented by Formula (c-2) are preferred. In an embodiment of the present invention, for example, a commercially available product, such as "ARON OXETANE OXT-221" and "ARON OXETANE OXT-121" (both available from ToaGosei Co., Ltd.), can be used.

[Chemical Formula 14]

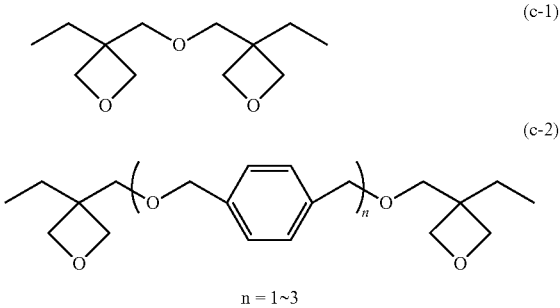

n = 1~3

Monomer Mixture

The monomer mixture according to an embodiment of the present invention at least contains the compound (I) and the compound (b). The monomer mixture according to an embodiment of the present invention may also contain one type or two or more types of compounds selected from the group consisting of the vinyl ether compound (A), the epoxy compound (B), and the oxetane compound (C).

The content of the compound (I) is 10 wt. % or greater (e.g. from 10 to 65 wt. %) based on the total amount of the monomer mixture according to an embodiment of the present invention. In particular, from the viewpoint of obtaining a cured product having excellent adhesion to a substrate, the lower limit is preferably 25 wt. %, more preferably 30 wt. %, particularly preferably 33 wt. %, and most preferably 35 wt. %. Furthermore, from the viewpoint of obtaining a cured product having a high hardness, the upper limit is preferably 55 wt. %, particularly preferably 50 wt. % or greater, and most preferably 45 wt. %. The content of the compound (I) lower than the range described above is not preferred because the adhesion to a substrate (especially, a metal and/or glass) of the obtained cured product is reduced.

The total content of the compound having at least one vinyl ether group and at least one hydroxy group and the compound having at least one oxetanyl group and at least one hydroxy group is preferably 25 wt. % or greater (e.g. from 25 to 65 wt. %) based on the total amount of the monomer mixture according to an embodiment of the present invention from the viewpoint of obtaining a cured product having excellent adhesion to a substrate and high hardness. In particular, from the viewpoint of excellent curability, the total content is preferably 25 wt. % or greater and less than 60 wt. %, most preferably from 25 to 55 wt. %, and especially preferably from 25 to 45 wt. %.

The total content of the compound (i-1) having one vinyl ether group and one hydroxy group and the compound (i-3) having one oxetanyl group and one hydroxy group is preferably 25 wt. % or greater (e.g. from 25 to 65 wt. %) based on the total amount of the monomer mixture according to an embodiment of the present invention from the viewpoint of achieving excellent adhesion to a substrate and obtaining a cured product having a high hardness. In particular, from the viewpoint of excellent curability, the total content is preferably 25 wt. % or greater and less than 60 wt. %, most preferably from 25 to 55 wt. %, and especially preferably from 25 to 45 wt. %.

The content of the compound (i-1) having one vinyl ether group and one hydroxy group is, for example, 30 wt. % or less, preferably 25 wt. % or less, and most preferably 18 wt. % or less, based on the total amount of the monomer mixture according to an embodiment of the present invention.

The content of the compound (i-3) having one oxetanyl group and one hydroxy group is preferably 15 wt. % or greater, more preferably 20 wt. % or greater, and particularly preferably 25 wt. % or greater, based on the total amount of the monomer mixture according to an embodiment of the present invention from the viewpoint of achieving excellent adhesion to a substrate and obtaining a cured product having high hardness. Furthermore, from the viewpoint of curability, the upper limit of the content is, for example, 55 wt. %, more preferably 45 wt. %, and especially preferably 40 wt. %.

The content of the compound (b) is 5 wt. % or greater based on the total amount of the monomer mixture according to an embodiment of the present invention. From the viewpoints of achieving rapid curability and obtaining a cured product having high hardness and excellent adhesion to glass and metals, the content is more preferably from 5 to 45 wt. %, particularly preferably from 5 to 40 wt. %, and most preferably from 5 to 30 wt. %. The content in the compound (b) lower than the range described above is not preferred because crack resistance of the obtained cured product is reduced, and the cured product tends to be brittle.

The weight ratio of the compound (I)/the compound (b) is, for example, 0.5 or greater, preferably 1.0 or greater, particularly preferably 1.1 or greater, and most preferably 1.3 or greater. Furthermore, the upper limit of the weight ratio is, for example, 6.5, preferably 5.5, particularly preferably 5.0, most preferably 4.5, and especially preferably 4.0.

The content of the compound having two or more cationically polymerizable groups selected from the group consisting of a vinyl ether group, an epoxy group, and an oxetanyl group in a molecule, the compound being other than the compound (I) and the compound (b), is, for example, 15 wt. % or greater, preferably 20 wt. % or greater, particularly preferably 25 wt. % or greater, and most preferably 30 wt. % or greater, based on the total amount of the monomer mixture according to an embodiment of the present invention from the viewpoint of curability. Note that the upper limit of the content is, for example, 55 wt. %, and preferably 50 wt. %, from the viewpoint of obtaining a cured product having a high hardness and excellent adhesion to glass and/or metals.

The content of the compound having two or more epoxy groups and having no hydroxy group in a molecule (preferably a compound having two or more alicyclic epoxy groups in a molecule, and particularly preferably a compound represented by Formula (b')), the compound being other than the compound (b), is, for example, preferably 20 wt. % or greater, and particularly preferably 25 wt. % or greater, based on the total amount of the monomer mixture according to an embodiment of the present invention from the viewpoints of achieving rapid curability and obtaining a cured product having high hardness. Note that the upper limit of the content is, for example, 50 wt. %, preferably 45 wt. %, and particularly preferably 43 wt. %, from the viewpoint of obtaining a cured product having high hardness and excellent adhesion to glass and/or metals.

The content of the compound having two or more vinyl ether groups and having no hydroxy group in a molecule is, for example, 20 wt. % or less, and more preferably 15 wt. % or less, based on the total amount of the monomer mixture according to an embodiment of the present invention.

The content of the compound having two or more oxetanyl groups and having no hydroxy group in a molecule is, for example, 20 wt. % or less, and more preferably 15 wt. % or less, based on the total amount of the monomer mixture according to an embodiment of the present invention.

The content of the compound having one cationically polymerizable group selected from the group consisting of a vinyl ether group, an epoxy group, and an oxetanyl group and having no hydroxy group in a molecule is, for example, preferably less than 30 wt. %, more preferably 20 wt. % or less, particularly preferably 10 wt. % or less, most preferably 5 wt. % or less, and especially preferably 1 wt. % or less, based on the total amount of the monomer mixture according to an embodiment of the present invention from the viewpoint of curability.

The monomer mixture according to an embodiment of the present invention can be produced by uniformly mixing the compound (I) and the compound (b), and optionally other monomers, by using a known device for mixing, such as a rotation/revolution-type agitating and defoaming device, a homogenizer, a planetary mixer, a three-roll mill, or a bead mill. Note that the components may be simultaneously mixed or sequentially mixed.

A curable composition can be obtained by mixing a curing catalyst into the monomer mixture having the composition described above. The curable composition obtained as described above has excellent curability and low curing shrinkage (that is, excellent dimensional stability), and can form a cured product having high hardness and excellent adhesion to glass and/or metals. Therefore, the monomer mixture according to an embodiment of the present invention is useful as a raw material for a curing composition having the characteristics described above.

Curable Composition

The curable composition according to an embodiment of the present invention contains the monomer mixture described above and a curing catalyst.

The content of the monomer mixture is, for example, from 50 to 99.9 wt. %, and preferably from 70 to 98 wt. %, based on the total amount (100 wt. %) of the curable composition according to an embodiment of the present invention.

The curing catalyst includes known and commonly used photocationic polymerization initiators and photoradical polymerization initiators. The curable composition according to an embodiment of the present invention preferably contains at least a photocationic polymerization initiator as the curing catalyst, and particularly preferably contains both the photocationic polymerization initiator and a photoradical polymerization initiator from the viewpoints of efficiently carrying out the curing reaction of the curable composition and obtaining a cured product having high hardness.

Examples of the photocationic polymerization initiator include diazonium salt-based compounds, iodonium salt-based compounds, sulfonium salt-based compounds, phosphonium salt-based compounds, selenium salt-based compounds, oxonium salt-based compounds, ammonium salt-based compounds, and bromine salt-based compounds. In an embodiment of the present invention, for example, commercially available products, such as trade names "CPI-101A", "CPI-100P", and "CPI-110P" (available from San-Apro Ltd.), trade names "CYRACURE UVI-6990" and "CYRACURE UVI-6992" (available from Dow Chemical), trade name "UVACURE1590" (available from Daicel-Allnex Ltd.), trade names "CD-1010", "CD-1011", and "CD-1012" (available from Sartomer USA); trade name "Irgacure-264" (available from BASF), trade name "CIT-1682" (available from Nippon Soda Co., Ltd.), and trade name "PHOTOINITIATOR 2074" (available from Rhodia Japan, Ltd.), can be preferably used. One type of these can be used alone, or two or more types of these can be used in combination.

Examples of the photoradical polymerization initiator include 1-hydroxycyclohexylphenylketone, 2-hydroxy-2-methyl-1-phenylpropan-1-one, diethoxyacetophenone, 1-(4-isopropylphenyl)-2-hydroxy-2-methylpropan-1-one, 1-(4-dodecylphenyl)-2-hydroxy-2-methylpropan-1-one, 4-(2-hydroxyethoxy)-phenyl(2-hydroxy-2-propyl)ketone, 2-methyl-1-[4-(methylthio)phenyl]-2-morpholinopropan-1-one, benzoin, benzoin methyl ether, benzoin ethyl ether, benzoin isopropyl ether, benzoin-n-butyl ether, benzoin phenyl ether, benzil dimethylketal, benzophenone, benzoylbenzoic acid, methyl benzoylbenzoate, 4-phenylbenzophenone-4-methoxybenzophenone, thioxanthone, 2-chlorothioxanthone, 2-methylthioxanthone, 2,4-dimethylthioxanthone, isopropylthioxanthone, 2,4-dichlorothioxanthone, 2,4-diethylthioxanthone, 2,4-diisopropylthioxanthone, 2,4,6-trimethylbenzoyldiphenylphosphine oxide, methylphenylglyoxylate, benzil, and camphorquinone. In an embodiment of the present invention, for example, commercially available products, such as trade names "Irgacure-184", "Irgacure-127", "Irgacure-149", "Irgacure-261", "Irgacure-369", "Irgacure-500", "Irgacure-651", "Irgacure-754", "Irgacure-784", "Irgacure-819", "Irgacure-907", "Irgacure-1116", "Irgacure-1173", "Irgacure-1664", "Irgacure-1700", "Irgacure-1800", "Irgacure-1850", "Irgacure-2959", "Irgacure-4043", "Darocur-1173", and "Darocur-MBF" (available from BASF), can be preferably used. One type of these can be used alone, or two or more types of these can be used in combination.

The used amount of the photocationic polymerization initiator is, for example, preferably from 0.1 to 20 parts by weight, more preferably from 0.5 to 10 parts by weight, and even more preferably from 1 to 10 parts by weight, per 100 parts by weight of the monomer mixture.

Furthermore, in the case where the photoradical polymerization initiator and the photocationic polymerization initiator are used together as the curing catalysts, the used amount of the photoradical polymerization initiator is preferably from 0.1 to 5 parts by weight, particularly preferably from 0.5 to 3 parts by weight, and most preferably from 0.5 to 2 parts by weight, per 100 parts by weight of the monomer mixture.

The curable composition according to an embodiment of the present invention may further contain a solvent; however, a solventless system, i.e. blending of no solvent, is preferred from the viewpoints of enhancing dryness, applicability to a substrate that is easily deteriorated by a solvent, and prevention of odor generation due to volatilization of a solvent. The content of such a solvent is 10 wt. % or less, preferably 5 wt. % or less, and particularly preferably 1 wt. % or less, based on the total amount (100 wt. %) of the curable composition.

The curable composition according to an embodiment of the present invention may contain another component as necessary, besides the monomer mixture and the curing catalyst. Examples of such another component include known and commonly used sensitizers (e.g. acridine compound, benzoflavins, perylenes, anthracenes, thioxanthone compounds, and laser dyes), sensitization auxiliary agent, surface conditioners, antioxidants, stabilizers such as amines. In particular, in the case where the curable composition according to an embodiment of the present invention is used for application where curing is performed by irradiating UV-LED, a sensitizer and optionally a sensitization auxiliary agent are preferably included from the viewpoint of enhancing curability by improving the ultraviolet light absorption of the curing catalyst. The content of these (the total amount in the case where two or more types are included) is, for example, from 0.05 to 10 parts by weight, and preferably from 0.1 to 5 parts by weight, per 100 parts by weight of the monomer mixture.

Furthermore, as the sensitizer, for example, a compound represented by Formula (d-1) and a compound represented by Formula (d-2) are preferably used in combination from the viewpoint of enhancing curability while suppressing coloring of the formed cured product to a significantly low level. The combined ratio of these compounds [compound represented by Formula (d-1)/compound represented by Formula (d-2); weight ratio] is, for example, from 0.01 to 1.0, preferably from 0.1 to 0.5, and particularly preferably from 0.2 to 0.5. Note that, as the compound represented by Formula (d-1), for example, trade name "ANTHRACURE UVS-1331" (available from Kawasaki Kasei Chemicals Ltd.) can be used. Furthermore, as the compound represented by Formula (d-2), for example, trade name "ANTHRACURE UVS-581" (available from Kawasaki Kasei Chemicals Ltd.) can be used.

[Chemical Formula 15]

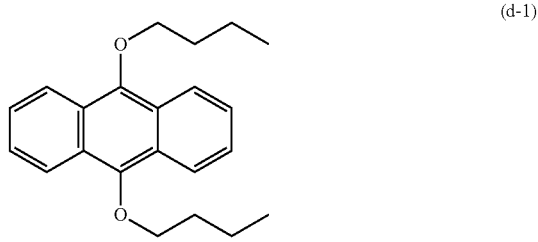

(d-1)

(d-2)

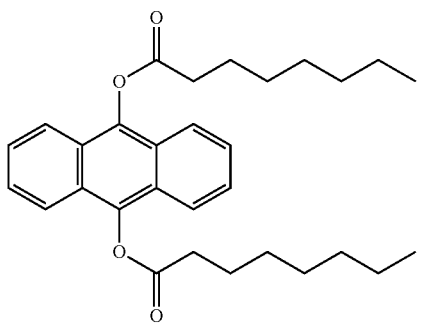

In the case where the curable composition according to an embodiment of the present invention is used as a color ink of an ultraviolet-curable inkjet ink, the curable composition preferably further contains a coloring material. The coloring material includes pigments and dyes. Note that, in the case where no coloring material is included, use as a clear ink is possible.

Pigment

As the pigment, a coloring material that is typically known as a pigment and that can be dispersed in the curable composition can be used without particular limitations. The average particle diameter of the pigment is, for example, preferably 300 nm or less from the viewpoint of achieving excellent discharging characteristics, jetting characteristics of ink, and printing reproducibility. One type of the pigment can be used alone, or two or more types of the pigments can be used in combination.

The pigment may also have magnetism, fluorescence, electric conductivity, or dielectric property in addition to color development and coloring characteristics. In this case, various functions can be imparted to the image.

Examples of the pigment that can be used include inorganic pigments, such as earthen pigments (e.g. ocher, amber); lapis lazuli; azurite; chalk; white wash; white lead; vermilion; ultramarine; viridian; cadmium red; carbonaceous pigments (e.g. carbon black, carbon refined, and carbon nanotubes); metal oxide pigments (e.g. iron black, cobalt blue, zinc oxide, titanium oxide, chromium oxide, and iron oxide); metal sulfide pigments (e.g. zinc sulfide); metal sulfates; metal carbonates (e.g. calcium carbonate, and magnesium carbonate); metal silicates; metal phosphates; and metal powders (e.g. aluminum powder, bronze powder, and zinc powder); organic pigments, such as insoluble azo pigments (e.g. monoazo yellow, monoazo red, monoazo violet, disazo yellow, disazo orange, and pyrazolone pigments); soluble azo pigments (e.g. azo yellow lake, and azo lake red); benzimidazolone pigments; β-naphthol pigments; naphthol AS pigment; condensed azo pigments; quinacridone pigments (e.g. quinacridone red, and quinacridone magenta); perylene pigments (e.g. perylene red, and perylene scarlet); perinone pigments (e.g. perinone orange); isoindolinone pigments (e.g. isoindolinone yellow, and isoindolinone orange); isoindoline pigments (e.g. isoindoline yellow); dioxazine pigments (e.g. dioxazine violet); thioindigo pigments; anthraquinone pigments; quinophthalone pigments (e.g. quinophthalone yellow); metal complex pigments; diketopyrrolopyrrole pigments; phthalocyanine pigments (e.g. phthalocyanine blue, and phthalocyanine green); and dye lake pigments; and fluorescent pigments, such as inorganic phosphors and organic phosphors.

Dye

Examples of the dye include nitroaniline-based, phenyl monoazo-based, pyridone azo-based, quinophthalone-based, styryl-based, anthraquinone-based, naphthalimide azo-based, benzothiazolyl azo-based, phenyl disazo-based, and thiazolylazo-based dyes.

The content of the coloring material (the total amount in the case where two or more types are contained) is, for example, from 0.5 to 20 parts by weight, and preferably from 1 to 15 parts by weight, per 100 parts by weight of the monomer composition.

Furthermore, in the case where the curable composition according to an embodiment of the present invention is used as an ultraviolet-curable inkjet ink, a dispersing agent is preferably included to enhance dispersibility of the coloring material. Examples of the dispersing agent include nonionic surfactants, ionic surfactants, charging agents, polymeric dispersants (e.g. trade names "Solsperse 24000" and "Solsperse 32000", available from Avecia; "AJISPER PB821", "AJISPER PB822", "AJISPER PB824", "AJISPER PB881", "AJISPER PN411", and "AJISPER PN411", available from Ajinomoto Fine-Techno Co., Inc.). One type alone or two or more types thereof in combination can be used.

The content of the dispersing agent is, for example, from 1 to 50 parts by weight, preferably from 3 to 30 parts by weight, and particularly preferably from 5 to 10 parts by weight, per 100 parts by weight of the coloring material.

The surface tension of the curable composition according to an embodiment of the present invention (at 30° C. and 1 atm) is, for example, from 10 to 50 mN/m. The viscosity of the curable composition according to an embodiment of the present invention [at 25° C. and shear rate of 100 (1/s)] is, for example, from 1 to 1000 mPa·s, preferably from 1 to 500 mPa·s, particularly preferably from 1 to 100 mPa·s, most preferably from 1 to 50 mPa·s, and especially preferably from 1 to 30 mPa·s. Therefore, the curable composition according to an embodiment of the present invention has excellent fluidity, and, for example, exhibits excellent discharging characteristics when discharged (or ejected) using an inkjet printing machine. Note that the surface tension of the composition can be measured by, for example, the Wilhelmy method (plate method) using the Accurate Surface Tensiometer "DY-700" (available from Kyowa Interface Science Co., Ltd.).

Furthermore, the curable composition according to an embodiment of the present invention can form a cured product by being rapidly cured upon ultraviolet light irradiation, even in the presence of oxygen or moisture. Therefore, even if moisture in the air is absorbed during the storage process, curability is not deteriorated. In other words, storage stability is excellent. Furthermore, in the case where the curable composition is used as an ultraviolet-curable inkjet ink, blur and generation of an odor can be prevented, and an ink coated film with excellent printing quality can be formed.

A light source for the ultraviolet light is not limited as long as the light source can apply light to the curable composition to generate an acid in the curable composition. For example, UV-LEDs, mercury lamps, such as low-, medium-, or high-pressure mercury lamps, mercury xenon lamps, metal halide lamps, tungsten lamps, arc lamps, excimer lamps, excimer lasers, semiconductor lasers, YAG lasers, laser systems using laser in combination with a nonlinear optical crystal, and high-frequency induction ultraviolet generators can be used. The quantity (integrated irradiance) of the ultraviolet light to be irradiated is, for example, from 10 to 5000 mJ/cm$^2$.

The curable composition according to an embodiment of the present invention may be further subjected to heat treatment after being irradiated with the ultraviolet light. By performing the heat treatment, the degree of curing can be further enhanced. In the case where heat treatment is performed, the heating temperature is from approximately 40 to 200° C., and the heating time is from approximately 1 minute to 15 hours. Furthermore, after the irradiation of the ultraviolet light, the degree of curing can be also enhanced by allowing the curable composition to stand still at room temperature (20° C.) for approximately 1 to 48 hours.

The curable composition according to an embodiment of the present invention can form a cured product having excellent adhesion to a wide range of substrates. The curable composition according to an embodiment of the present invention exhibits excellent adhesion to glass and metals (e.g. aluminum foil, copper foil, and SUS plate) in addition to plastics (e.g. polyethylene, polypropylene, polyethylene terephthalate (PET), vinyl chloride resins, polycarbonates, and ABS resins), natural rubber, butyl rubber, foams (e.g. polyurethane, and polychloroprene rubber), wood, woven fabric, nonwoven fabric, fabric, paper (e.g. woodfree paper, glassine paper, kraft paper, and Japanese paper), silicon wafer, ceramics; and composites of these. Therefore, typically, it has been necessary to perform preprocess (e.g. primer treatment) to a glass or metal surface to allow a cured product to be adhered onto the glass or metal; however, in the case where the curable composition according to an embodiment of the present invention is used, preprocess is not necessary, and the curable composition can be directly applied to the glass or metal to form a cured product having excellent adhesion by being cured. Thus, significantly excellent workability is achieved.

Furthermore, the curable composition according to an embodiment of the present invention can form a cured product having excellent dimensional stability because shrinkage during the curing is significantly small. In the case where a cured product having a three-dimensional structure is formed by, for example, applying the curable composition according to an embodiment of the present invention by using a 3D printer or the like, a cured product having the desired shape can be thus significantly accurately formed.

Furthermore, the curable composition according to an embodiment of the present invention can form a cured product having high hardness (pencil hardness (based on JIS K 5600-5-4) is, for example, B or higher, preferably H or higher, and particularly preferably 2H or higher).

Furthermore, the cured product of the curable composition according to an embodiment of the present invention has excellent heat resistance, and the glass transition temperature (Tg) or the melting point (Tm) of the cured product is, for example, 70° C. or higher, and preferably 80° C. or higher. The upper limit of the glass transition temperature (Tg) or the melting point (Tm) of the cured product is, for example, 150° C. Therefore, the curable composition according to an embodiment of the present invention can be used for vehicle onboard equipment. Note that the glass transition temperature (Tg) or the melting point (Tm) of the cured product can be measured by, for example, thermal analysis such as DSC and TGA or dynamic viscoelastic measurement.

The curable composition according to an embodiment of the present invention can be suitably used as ultraviolet-curable inkjet ink materials, adhesive agents, coating agents (or paints), encapsulants, civil engineering and construction materials, laminates and other electric/electronic components, photoresists, solder resists, interlayer components for multilayer printed circuit boards, insulating materials, repairing materials for concrete buildings, casting materials, sealants, and materials for optical shaping, optical materials such as lenses and optical waveguides.

Use of the curable composition according to an embodiment of the present invention as, for example, an ultraviolet-curable inkjet ink can suppress generation of an odor and can form an ink coated film that is significantly highly accurate and that has high hardness without particularly limiting the target to be printed even in the air atmosphere.

Molded Article and Production Method Thereof

The molded article according to an embodiment of the present invention is formed from a cured product of the curable composition described above. The molded article according to an embodiment of the present invention can be produced by ejecting the curable composition described above using inkjet method, and then curing the ejected curable composition.

A three-dimensional molded article may be produced by cutting or the like of the cured product of the curable composition described above, may be produced by molding the curable composition described above, or may be produced by using a three-dimensional printer by inkjet method or the like.

The shape and the thickness of the molded article can be appropriately adjusted depending on the purpose of use.

When the curable composition is used for forming a molded article (e.g. three-dimensional molded article), a molded article having a desired shape can be easily and efficiently produced because the curable composition has rapid curability.

The molded article according to an embodiment of the present invention is formed from a cured product of the curable composition described above, and thus the molded article has low curing shrinkage and excellent dimensional stability. Furthermore, the molded article has high hardness (pencil hardness (based on JIS K 5600-5-4) is, for example, B or higher) and is less likely to be scratched (i.e. has excellent scratch resistance).

Structure and Production Method Thereof

The structure according to an embodiment of the present invention has a configuration including the cured product of the curable composition on a substrate surface. The structure can be produced by, for example, ejecting the curable composition described above on a substrate surface using inkjet method, and then curing the ejected curable composition.

The shape and the thickness of the cured product can be appropriately adjusted depending on the purpose of use.

As the substrate, substrates described above can be used without particular limitation. The structure according to an embodiment of the present invention is formed by using the curable composition described above, and thus the structure has excellent adhesion to a substrate (not only to plastics but also to metals and glass), and the adhesion to a substrate is, for example, classified to be grade 0 to grade 2 in the 6-grade classification test of the Cross-cut method (based on JIS K 5600-5-6).

Furthermore, the curable composition described above has rapid curability, and thus the structure (e.g. structure having a printing or coating film formed from the cured product of the curable composition on a substrate surface) can be efficiently produced.

Furthermore, the structure is formed by using the curable composition described above, and thus the structure has low curing shrinkage and excellent dimensional stability. Furthermore, the structure has high hardness (pencil hardness (based on JIS K 5600-5-4) is, for example, B or higher) and is less likely to be scratched (i.e. has excellent scratch resistance).

EXAMPLES

Hereinafter, the present invention will be described more specifically with reference to examples, however, the present invention is not limited by these examples.

Example 1

Components were mixed according to formulation shown in Table 1 (unit is in part by weight), and an ink was obtained. The viscosity of the obtained ink at 25° C. and the shear rate of 100 (1/s) was measured by using an E-type viscometer (trade name "Viscometer TV-25", available from Toki Sangyo Co., Ltd.). The viscosity was 22.6 mPa·s.

Examples of 2 to 30 and Comparative Examples 1 to 3

Each ink was obtained in the same manner as in Example 1 except for changing the formulation to the ones shown in Table 1 (unit is in part by weight), and an ink was obtained.

Example 31

Components were mixed according to formulation shown in Table 1 (unit is in part by weight), and an ink was obtained. The viscosity of the obtained ink at 25° C. and the shear rate of 100 (1/s) was 23 mPa·s. The viscosity at 45° C. and the shear rate of 100 (1/s) was 8.7 mPa·s. The surface tension at 30° C. and at 1 atm was 32.1 mN/m. Furthermore, after the obtained ink was stored at 50° C. for 2 weeks, the viscosity at 25° C. and the shear rate of 100 (1/s) was 23 mPa·s, and it was found that the obtained ink had storage stability. Furthermore, the curing sensitivity of the obtained ink was not deteriorated by humidity, and the obtained ink exhibited rapid curability even in an environment at the humidity of 50 to 66%. When this ink was subjected to ultraviolet light irradiation using a 365 nm LED, the ink was cured by the integrated irradiance of approximately 600 mJ/cm².

Adhesion Evaluation

The inks obtained in Examples and Comparative Examples were applied on glass plates (trade name "S9112", available from Matsunami Glass Ind., Ltd.), aluminum plates (trade name "A1050P", available from AS ONE Corporation), and SUS plates (trade name "SUS304", available from AS ONE Corporation) (coating thickness: 5 μm) and irradiated with light of 365 nm by using an LED irradiator as a light source in the air atmosphere to obtain cured products/substrate laminates.

The obtained laminates were subjected to adhesion test (cross-cut method; based on JIS K 5600-5-6 (ISO 2409)), and the adhesion was evaluated by 6-grade classification test.

Hardness Evaluation

The inks obtained in Examples and Comparative Examples were applied on glass substrates in the thickness of approximately 10 μm by using a bar coater and irradiated with light of 365 nm by using an LED irradiator until no tackiness was observed, to cure the ink. Thus, cured products/substrate laminates were obtained. The obtained laminates were further subjected to heat treatment at the temperature of 80° C. for 30 minutes by using an oven. These were used as samples.

The pencil hardness of the cured product surface of the samples was measured by the method based on JIS K 5600-5-4 (ISO/DIN 15184).

Dimensional Stability Evaluation

The adhesive agents obtained in Examples and Comparative Examples were applied to PET substrates (size: length× width=1 cm×7 cm; thickness: 100 μm) as the substrate (coating thickness: 10 μm) and irradiated with light of 365 nm in the air atmosphere by using an LED irradiator until no tackiness was observed, to obtain cured products/PET substrate laminates.

The obtained cured products/PET substrate laminates (size: length×width=1 cm×7 cm) were used as test pieces. These were placed on a horizontal surface, and when one short side of each of the test pieces was pressed down, an amount of floating of the other short side from the horizontal surface was measured. Warpage resistance was evaluated based on the criteria described below (FIG. 1). Note that a smaller floating amount indicates superior warpage resistance.

Excellent: The floating amount was less than 1 mm.
Good: The floating amount was 1 mm or greater but less than 2 mm.
Somewhat poor: The floating amount was 2 mm or greater but less than 5 mm.
Poor: The floating amount was 5 mm or greater.
The results are shown together in the table below.

TABLE 1

| | | EXAMPLES | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Compound (I) | HEVE | 10 | — | — | 10 | 10 | 10 | 10 | — | — | — | 10 | 10 |
| | HBVE | — | 10 | — | — | — | — | — | 10 | — | — | — | — |
| | DEGMVE | — | — | 10 | — | — | — | — | — | — | — | — | — |
| | OXT101 | 30 | 30 | 30 | 30 | 30 | 30 | 30 | 30 | 30 | 30 | 30 | 30 |
| Combound (b) | 1,6-HDGE | 20 | 20 | 20 | — | — | — | — | — | — | — | — | — |
| | 1,4-BDGE | — | — | — | 20 | — | — | — | 20 | 20 | 20 | 20 | 20 |
| | 1,2-EDGE | — | — | — | — | 20 | — | — | — | — | — | — | — |
| | NPGDGE | — | — | — | — | — | 20 | — | — | — | — | — | — |
| | YH300 | — | — | — | — | — | — | 20 | — | — | — | — | — |
| Compound (I)/Combound (b) | | 2 | 2 | 2 | 2 | 2 | 2 | 2 | 2 | 1.5 | 1.5 | 2 | 2 |
| Other cationically polymerizable monomer | ISBDVE | 10 | 10 | 10 | 10 | 10 | 10 | 10 | 10 | — | — | — | — |
| | ONBDVE | — | — | — | — | — | — | — | — | — | — | 10 | — |
| | CHDVE | — | — | — | — | — | — | — | — | — | — | — | 10 |
| | 2021P | 30 | 30 | 30 | 30 | 30 | 30 | 30 | 30 | 50 | — | 30 | 30 |
| | b'-I | — | — | — | — | — | — | — | — | — | 50 | — | — |
| | 2-EHVE | — | — | — | — | — | — | — | — | — | — | — | — |

TABLE 1-continued

|  |  | | | | | | | | | | | | |
|---|---|---|---|---|---|---|---|---|---|---|---|---|---|
|  | TEGDVE | — | — | — | — | — | — | — | — | — | — | — | — |
|  | OXT212 | — | — | — | — | — | — | — | — | — | — | — | — |
|  | OXT221 | — | — | — | — | — | — | — | — | — | — | — | — |
| Radically polymerizable monomer | DCPA | — | — | — | — | — | — | — | — | — | — | — | — |
|  | DPGDA | — | — | — | — | — | — | — | — | — | — | — | — |
|  | VEEA | — | — | — | — | — | — | — | — | — | — | — | — |
| Photocationic polymerization initiator | CPI-110P | 5 | 5 | 5 | 5 | 5 | 5 | 5 | 5 | 5 | 5 | 5 | 5 |
| Photoradical polymerization initiator | Irg184 | — | — | — | — | — | — | — | — | — | — | — | — |
| Sensitizer | UVS1331 | 0.3 | 0.3 | 0.3 | 0.3 | 0.3 | 0.3 | 0.3 | 0.3 | 0.3 | 0.3 | 0.3 | 0.3 |
|  | UVS581 | 1 | 1 | 1 | 1 | 1 | 1 | 1 | 1 | 1 | 1 | 1 | 1 |
| Adhesion | Glass | 0 | 0 | 0 | 0 | 0 | 0 | 0 | 0 | 0 | 0 | 0 | 0 |
|  | Al | 0 | 1 | 1 | 0 | 0 | 0 | 1 | 0 | 0 | 0 | 0 | 0 |
|  | SUS | 0 | 1 | 1 | 0 | 0 | 0 | 0 | 0 | 0 | 0 | 0 | 0 |
| Hardness |  | H | H | H | 3H | 3H | 4H | 4H | 3H | 3H | 3H | 3H | 3H |
| Dimensional stability |  | Excellent | Excellent | Excellent | Excellent | Excellent | Excellent | Excellent | Excellent | Excellent | Excellent | Excellent | Excellent |

| | | EXAMPLES | | | | | | | | |
|---|---|---|---|---|---|---|---|---|---|---|
| | | 13 | 14 | 15 | 16 | 17 | 18 | 19 | 20 | 21 |
| Compound (I) | HEVE | 10 | 20 | 10 | 5 | — | 5 | — | — | — |
|  | HBVE | — | — | — | — | 10 | — | 10 | 10 | 10 |
|  | DEGMVE | — | — | — | — | — | — | — | — | — |
|  | OXT101 | 30 | 30 | 30 | 20 | 30 | 30 | 30 | 30 | 30 |
| Combound (b) | 1,6-HDGE | — | — | — | 20 | 15 | — | — | — | — |
|  | 1,4-BDGE | 20 | 20 | 20 | — | — | 20 | 20 | 20 | 20 |
|  | 1,2-EDGE | — | — | — | — | — | — | — | — | — |
|  | NPGDGE | — | — | — | — | — | — | — | — | — |
|  | YH300 | — | — | 15 | — | — | — | — | — | — |
| Compound (I)/Combound (b) | | 2 | 2.5 | 1.14 | 1.25 | 2.67 | 1.75 | 2 | 2 | 2 |
| Other cationically polymerizable monomer | ISBDVE | 10 | — | 10 | 10 | 5 | 5 | 10 | 10 | 10 |
|  | ONBDVE | — | — | — | — | — | — | — | — | — |
|  | CHDVE | — | — | — | — | — | — | — | — | — |
|  | 2021P | — | 30 | 15 | 45 | 40 | 40 | — | — | — |
|  | b'-I | 30 | — | — | — | — | — | 30 | 30 | 30 |
|  | 2-EHVE | — | — | — | — | — | — | — | — | — |
|  | TEGDVE | — | — | — | — | — | — | — | — | — |
|  | OXT212 | — | — | — | — | — | — | — | — | — |
|  | OXT221 | — | — | — | — | — | — | — | — | — |
| Radically polymerizable monomer | DCPA | — | — | — | — | — | — | — | — | — |
|  | DPGDA | — | — | — | — | — | — | — | — | — |
|  | VEEA | — | — | — | — | — | — | — | — | — |
| Photocationic polymerization initiator | CPI-110P | 5 | 5 | 5 | 5 | 5 | 5 | 2 | 5 | 10 |
| Photoradical polymerization initiator | Irg184 | — | — | — | — | — | — | — | — | — |
| Sensitizer | UVS1331 | 0.3 | 0.3 | 0.3 | 0.3 | 0.3 | 0.3 | — | — | — |
|  | UVS581 | 1 | 1 | 1 | 1 | 1 | 1 | — | — | — |
| Adhesion | Glass | 0 | 0 | 0 | 0 | 0 | 0 | 0 | 0 | 0 |
|  | Al | 0 | 0 | 1 | 1 | 1 | 0 | 0 | 0 | 0 |
|  | SUS | 0 | 0 | 1 | 0 | 0 | 0 | 0 | 0 | 0 |
| Hardness | | 4H | HB | 3H | H | H | H | 4H | 4H | 4H |
| Dimensional stability | | Excellent | Excellent | Excellent | Excellent | Excellent | Excellent | Excellent | Excellent | Excellent |

| | | EXAMPLES | | | | | | | | | | Copparative EXAMPLES | | |
|---|---|---|---|---|---|---|---|---|---|---|---|---|---|---|
| | | 22 | 23 | 24 | 25 | 26 | 27 | 28 | 29 | 30 | 31 | 1 | 2 | 3 |
| Compound (I) | HEVE | — | 10 | 11 | — | 10 | 10 | 10 | 10 | — | 10 | — | — | — |
|  | HBVE | 10 | — | — | — | — | — | — | — | — | — | — | — | — |
|  | DEGMVE | — | — | — | — | — | — | — | — | — | — | — | — | — |
|  | OXT101 | 30 | 30 | 34 | 38 | 50 | 30 | 20 | 10 | 30 | 30 | — | — | 12 |
| Combound (b) | 1,6-HDGE | — | — | — | — | — | — | — | — | — | — | — | — | — |
|  | 1,4-BDGE | 20 | 20 | 22 | 25 | 10 | 10 | 20 | 20 | 20 | 10 | 20 | — | — |
|  | 1,2-EDGE | — | — | — | — | — | — | — | — | — | — | — | — | — |
|  | NPGDGE | — | — | — | — | — | — | — | — | — | — | — | — | — |
|  | YH300 | — | — | — | — | — | — | — | — | — | — | — | — | — |
| Compound (I)/Combound (b) | | 2 | 2 | 2.05 | 1.52 | 6 | 4 | 1.5 | 1 | 1.5 | 4 | — | — | — |
| Other cationically polymerizable monomer | ISBDVE | 10 | 10 | — | — | 10 | 10 | 10 | 10 | 5 | 10 | — | — | — |
|  | ONBDVE | — | — | — | — | — | — | — | — | — | — | — | — | — |
|  | CHDVE | — | — | — | — | — | — | — | — | — | — | — | — | — |
|  | 2021P | 30 | 30 | 33 | 37 | 30 | 30 | 30 | 30 | 35 | 30 | — | — | 48 |

TABLE 1-continued

| | | 1 | 2 | 3 | 4 | 5 | 6 | 7 | 8 | 9 | 10 | 11 | 12 | 13 |
|---|---|---|---|---|---|---|---|---|---|---|---|---|---|---|
| | b'-I | — | — | — | — | — | — | — | — | — | — | — | — | — |
| | 2-EHVE | — | — | — | — | — | — | — | — | 10 | — | 10 | — | — |
| | TEGDVE | — | — | — | — | — | — | — | — | — | — | — | — | 40 |
| | OXT212 | — | — | — | — | — | — | 10 | 20 | — | — | 30 | — | — |
| | OXT221 | — | — | — | — | — | 10 | — | — | — | 10 | — | — | — |
| Radically polymerizable monomer | DCPA | — | — | — | — | — | — | — | — | — | — | — | 25 | — |
| | DPGDA | — | — | — | — | — | — | — | — | — | — | — | 50 | — |
| | VEEA | — | — | — | — | — | — | — | — | — | — | — | 25 | — |
| Photocationic polymerization initiator | CPI-110P | 5 | 10 | 10 | 10 | 10 | 10 | 5 | 5 | 5 | 5 | 5 | — | — |
| Photoradical polymerization initiator | Irg184 | — | — | — | — | — | — | — | — | 1 | — | 5 | 5 | 5 |
| Sensitizer | UVS1331 | — | — | — | — | — | — | 0.3 | 0.3 | 0.3 | 0.3 | 0.3 | 0.3 | 0.3 |
| | UVS581 | — | — | — | — | — | — | 1 | 1 | 1 | 1 | 1 | 1 | 1 |
| Adhesion | Glass | 0 | 0 | 0 | 0 | 0 | 0 | 0 | 1 | 0 | 0 | 1 | 5 | 2 |
| | Al | 0 | 0 | 0 | 0 | 0 | 0 | 3 | 4 | 3 | 0 | 5 | 5 | 5 |
| | SUS | 0 | 0 | 0 | 0 | 0 | 0 | 2 | 4 | 2 | 0 | 5 | 5 | 5 |
| Hardness | | H | H | H | F | 2B | 2H | H | HB | H | 2H | 3B | 2B | HB |
| Dimensional stability | | Excellent | Excellent | Excellent | Excellent | Excellent | Excellent | Good | Good | Good | Excellent | Somewhat poor | Poor | Poor |

Note that abbreviations in the table are described below.

Compound (I)
HEVE: ethylene glycol monovinyl ether
HBVE: 4-hydroxybutyl vinyl ether
DEGMVE: diethylene glycol monovinyl ether
OXT101: 3-ethyl-3-hydroxymethyloxetane, trade name "ARON OXETANE OXT-101", available from ToaGosei Co., Ltd.

Compound (b)
1,6-HDGE: 1,6-hexanediol diglycidyl ether
1,4-BDGE: 1,4-butanediol diglycidyl ether
1,2-EDGE: ethylene glycol diglycidyl ether
NPGDGE: neopentyl glycol diglycidyl ether
YH300: trimethylolpropane triglycidyl ether Other Cationically Polymerizable Monomer
ISBDVE: isosorbide divinyl ether, trade name "ISB-DVE", available from Daicel Corporation
ONBDVE: oxanorbornene divinyl ether
CHDVE: 1,4-cyclohexane diol divinyl ether
2021P: 3,4-epoxycyclohexylmethyl(3,4-epoxy)cyclohexanecarboxylate, trade name "CELLOXIDE 2021P", available from Daicel Corporation
b'-1: (3,4,3',4'-diepoxy)bicyclohexyl
2-EHVE: 2-ethylhexylvinyl ether
TEGDVE: triethylene glycol divinyl ether
OXT212: 3-ethyl-3-[(2-ethylhexyloxy)methyl]oxetane, trade name "ARON OXETANE OXT-212", available from ToaGosei Co., Ltd.
OXT221: bis[1-ethyl(3-oxetanyl)]methyl ether, product name "ARON OXETANE OXT-221", available from ToaGosei Co., Ltd.

Radically Polymerizable Monomer
DCPA: tricyclodecane dimethanol diacrylate
DPGDA: dipropylene glycol diacrylate
VEEA: 2-(2-vinyloxyethoxy)ethyl acrylate Curing Catalyst
CPI-110P: mixture of diphenyl[4-(phenylthio)phenyl]sulfonium hexafluorophosphate and thiodi-p-phenylenebis(diphenylsulfonium)bis(hexafluorophosphate) (99.5/0.5), trade name "CPI-110P", available from San-Apro Ltd.
Irg184: 1-hydroxy-cyclohexyl-phenyl-ketone, trade name "Irgacure 184", available from BASF Sensitizer
UVS1331: 9,10-dibutoxyanthracene, trade name "ANTHRACURE UVS-1331", available from Kawasaki Kasei Chemicals Ltd.
UVS581: 9,10-di(capryloyloxy)anthracene, trade name "ANTHRACURE UVS-581", available from Kawasaki Kasei Chemicals Ltd.

As a summary of the above, the configurations of the present invention and variations thereof are described below.

[1] A monomer mixture containing two or more types of cationically polymerizable monomers, the monomer mixture including, as the cationically polymerizable monomers, not less than 10 wt. %, based on a total amount of the monomer mixture, of a compound having at least one cationically polymerizable group selected from the group consisting of a vinyl ether group, an epoxy group, and an oxetanyl group, and at least one hydroxy group in a molecule (=compound (I)), and not less than 5 wt. %, based on the total amount of the monomer mixture, of a compound represented by Formula (b) below (=compound (b)).

[2] The monomer mixture according to [1], wherein the compound (I) is a compound having one cationically polymerizable group selected from the group consisting of a vinyl ether group, an epoxy group, and an oxetanyl group and having one hydroxy group in a molecule.

[3] The monomer mixture according to [1], where the compound (I) is a compound (i-1) having one vinyl ether group and one hydroxy group and/or a compound (i-3) having one oxetanyl group and one hydroxy group.

[4] The monomer mixture according to [1], where the compound (I) is at least one type of compound selected from the group consisting of compounds represented by Formulae (i-1-1), (i-1-2), (i-1-3), and (i-3-1).

[5] The monomer mixture according to [1], where the compound (I) is a compound represented by Formula (i-3-1).

[6] The monomer mixture according to any one of [1] to [5], the compound (b) is at least one type of compound selected from the group consisting of compounds represented by Formulae (b-1) to (b-5), trimethylolethane triglycidyl ether, pentaerythritol tetraglycidyl ether, glycerin triglycidyl ether, and dipentaerythritol hexaglycidyl ether.

[7] The monomer mixture according to any one of [1] to [5], where the compound (b) is at least one type of compound selected from the group consisting of compounds represented by Formulae (b-1) to (b-5).

[8] The monomer mixture according to any one of [1] to [5], where the compound (b) is at least one type of compound selected from the group consisting of compounds represented by Formulae (b-1) to (b-4).

[9] The monomer mixture according to any one of [1] to [8], further containing, as the cationically polymerizable monomer, at least 20 wt. %, based on the total amount of the monomer mixture, of a compound represented by Formula (b') (=compound (b')).

[10] The monomer mixture according to [9], where the compound (b') is at least one type of compound selected from the group consisting of 3,4-epoxycyclohexylmethyl(3,4-epoxy)cyclohexanecarboxylate, (3,4,3',4'-diepoxy)bicyclohexyl, bis(3,4-epoxycyclohexylmethyl)ether, 1,2-epoxy-1,2-bis(3,4-epoxycyclohexan-1-yl)ethane, 2,2-bis(3,4-epoxycyclohexan-1-yl)propane, and 1,2-bis(3,4-epoxycyclohexan-1-yl)ethane.

[11] The monomer mixture according to [9], where the compound (b') is a compound in which X in Formula (b') is represented by a single bond or a linking group (except groups containing an ester bond) (=compound (b'-1)).

[12] The monomer mixture according to [11], where the compound (b'-1) is at least one type of compound selected from the group consisting of (3,4,3',4'-diepoxy)bicyclohexyl, bis(3,4-epoxycyclohexylmethyl)ether, 1,2-epoxy-1,2-bis(3,4-epoxycyclohexan-1-yl)ethane, 2,2-bis(3,4-epoxycyclohexan-1-yl)propane, and 1,2-bis(3,4-epoxycyclohexan-1-yl)ethane.

[13] The monomer mixture according to any one of [1] to [12], further containing, as the cationically polymerizable monomer, a compound having two or more oxetanyl groups in a molecule.

[14] The monomer mixture according to any one of [1] to [12], further containing, as the cationically polymerizable monomer, a compound represented by Formula (c-1) and/or a compound represented by Formula (c-2).

[15] The monomer mixture according to any one of [1] to [14], where a content of a compound having one cationically polymerizable group selected from the group consisting of a vinyl ether group, an epoxy group, and an oxetanyl group and having no hydroxy group in a molecule is less than 30 wt. % of the total amount of the monomer mixture.

[16] A curable composition containing the monomer mixture described in any one of [1] to [15] and a curing catalyst.

[17] The curable composition according to [16], containing a sensitizer, or a sensitizer and a sensitization auxiliary aid.

[18] The curable composition according to [17], where, as the sensitizer, a compound represented by Formula (d-1) and/or a compound represented by Formula (d-2) is used.

[19] The curable composition according to any one of [16] to [18], containing a coloring material.

[20] The curable composition according to any one of [16] to [19], containing a dispersing agent.

[21] The curable composition according to any one of [16] to [20], where a surface tension at 30° C. and 1 atm is from 10 to 50 mN/m.

[22] The curable composition according to any one of [16] to [21], where a viscosity at 25° C. and at the shear rate of 100 s$^{-1}$ is from 1 to 1000 mPa·s.

[23] The curable composition according to any one of [16] to [22], where the curable composition is an ultraviolet-curable inkjet ink.

[24] The curable composition according to any one of [16] to [22], where the curable composition is a coating agent.

[25] The curable composition according to any one of [16] to [22], where the curable composition is an adhesive agent.

[26] A cured product of the curable composition described in any one of [16] to [25].

[27] The cured product according to [26], where a glass transition temperature (Tg) or a melting point (Tm) is 70° C. or higher.

[28] The cured product according to [26] or [27], where the pencil hardness measured by a method based on JIS K 5600-5-4 is B or higher (preferably H or higher, and particularly preferably 2H or higher).

[29] The cured product according to any one of [26] to [28], where an adhesion to a glass plate determined by adhesion test using the cross-cut method based on JIS K 5600-5-6 (ISO 2409) is grade 0 in terms of 6-grade classification.

[30] The cured product according to any one of [26] to [28], where an adhesion to an aluminum plate determined by adhesion test using the cross-cut method based on JIS K 5600-5-6 (ISO 2409) is grade 4 or higher (preferably grade 3 or higher, particularly preferably grade 2 or higher, and most preferably grade 1 or higher) in terms of the 6-grade classification.

[31] The cured product according to any one of [26] to [28], where an adhesion to an SUS plate determined by adhesion test using the cross-cut method based on JIS K 5600-5-6 (ISO 2409) is grade 4 or higher (preferably grade 3 or higher, particularly preferably grade 2 or higher, and most preferably grade 1 or higher) in terms of the 6-grade classification.

[32] A molded article formed from the cured product described in any one of [26] to [31].

[33] A method of producing a molded article including: ejecting the curable composition described in any one of [16] to [25] using inkjet method, then curing the ejected curable composition, and obtaining a molded article formed from a cured product of the curable composition.

[34] A structure having the cured product described in any one of [26] to [31] on a substrate surface.

INDUSTRIAL APPLICABILITY

The curable composition obtained by blending a curing catalyst in the monomer mixture according to an embodiment of the present invention has a low viscosity and excellent coatability prior to irradiation with ultraviolet light, can be rapidly cured in the presence of oxygen and even in the presence of moisture by irradiation of ultraviolet radiation, and can form a cured product having high hardness and excellent adhesion to metals and/or glass. Furthermore, the cured product has a low curing shrinkage and excellent dimensional stability. The curable composition can be thus suitably used as ultraviolet-curable inkjet inks, coating agents, and adhesive agents.

REFERENCE SIGNS LIST

1 Test piece
2 Warpage amount
3 Horizontal plane

The invention claimed is:
1. A monomer mixture comprising two or more types of cationically polymerizable monomers,
the monomer mixture comprising:
not less than 10 wt. %, based on a total amount of the monomer mixture, of a compound (I);
not less than 5 wt. %, based on the total amount of the monomer mixture, of a compound (b); and

15 to 50 wt. %, based on the total amount of the monomer mixture, of a compound (b'), and
the monomer mixture having a weight ratio of the compound (I) to the compound (b) of from 1.1 to 5.5,
where:
the compound (I) has at least one cationically polymerizable group selected from the group consisting of a vinyl ether group, an epoxy group, and an oxetanyl group, and at least one hydroxy group in a molecule,
the compound (b) is represented by Formula (b):

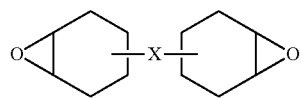
(b)

where R represents an s-valent straight-chain or branched saturated aliphatic hydrocarbon group or an s-valent group having two or more straight-chain or branched saturated aliphatic hydrocarbon groups bonded to each other through an ether bond, and s represents an integer of 2 or greater, and
the compound (b') is represented by Formula (b'):

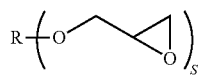
(b')

where X represents a single bond or a linking group;
the monomer mixture further comprising:
at least one of a compound represented by Formula (a-1) and a compound represented by Formula (a-2):

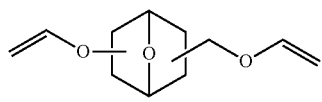
(a-1)

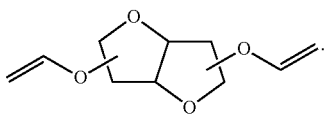
(a-2)

2. The monomer mixture according to claim 1, wherein a content of a compound having one cationically polymerizable group selected from the group consisting of a vinyl ether group, an epoxy group, and an oxetanyl group and having no hydroxy group in a molecule is less than 30 wt. % based on the total amount of the monomer mixture.

3. A curable composition comprising the monomer mixture described in claim 1 and a curing catalyst.

4. The curable composition according to claim 3, comprising a sensitizer, or a sensitizer and a sensitization auxiliary agent.

5. The curable composition according to claim 3, comprising a coloring material.

6. The curable composition according to claim 3, comprising a dispersing agent.

7. The curable composition according to claim 3, wherein the curable composition is an ultraviolet-curable inkjet ink.

8. A method of producing a molded article comprising: ejecting the curable composition described in claim 7 using an inkjet method, then curing the ejected curable composition, and forming a molded article from a cured product of the curable composition.

9. The curable composition according to claim 3, wherein the curable composition is a coating agent.

10. The curable composition according to claim 3, wherein the curable composition is an adhesive agent.

11. A cured product of the curable composition described in claim 3.

12. A molded article formed from the cured product described in claim 11.

13. A structure comprising the cured product described in claim 11 on a substrate surface.

* * * * *